(12) United States Patent
Ando et al.

(10) Patent No.: US 8,098,480 B2
(45) Date of Patent: Jan. 17, 2012

(54) LITHIUM ION CAPACITOR

(75) Inventors: Nobuo Ando, Tokyo (JP); Kenji Kojima, Tokyo (JP); Shinichi Tasaki, Kanagawa (JP); Hiromoto Taguchi, Kanagawa (JP); Kohei Matsui, Hiroshima (JP); Atsuro Shirakami, Tokyo (JP); Yukinori Hato, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 434 days.

(21) Appl. No.: 12/089,344

(22) PCT Filed: Oct. 17, 2006

(86) PCT No.: PCT/JP2006/320663
§ 371 (c)(1),
(2), (4) Date: Apr. 4, 2008

(87) PCT Pub. No.: WO2007/046382
PCT Pub. Date: Apr. 26, 2007

(65) Prior Publication Data
US 2010/0128415 A1   May 27, 2010

(30) Foreign Application Priority Data
Oct. 17, 2005 (JP) .................... 2005-302342

(51) Int. Cl.
*H01G 9/00* (2006.01)
*H01G 9/02* (2006.01)
(52) U.S. Cl. ................... 361/502; 361/505
(58) Field of Classification Search ............ 361/505, 361/503, 516, 508, 502
See application file for complete search history.

(56) References Cited

U.S. PATENT DOCUMENTS

| 5,172,307 A | * | 12/1992 | Tabuchi et al. ............ 361/502 |
| 6,475,461 B1 | * | 11/2002 | Ohsaki et al. ............ 423/445 R |
| 7,385,801 B2 | * | 6/2008 | Ando et al. ............ 361/503 |
| 2004/0179328 A1 | * | 9/2004 | Ando et al. ............ 361/504 |

FOREIGN PATENT DOCUMENTS

| JP | 8-107048 | 4/1996 |
| JP | 9-55342 | 2/1997 |
| JP | 9-232190 | 9/1997 |
| JP | 11-297578 | 10/1999 |
| WO | 96/30318 | 10/1996 |
| WO | 98/33227 | 7/1998 |
| WO | 2004/097867 | 11/2004 |

OTHER PUBLICATIONS

International Search Report (English & Japanese) for PCT/JP2006/320663 mailed Jan. 16, 2007 (2 pages).

(Continued)

*Primary Examiner* — Eric Thomas
*Assistant Examiner* — David M Sinclair
(74) *Attorney, Agent, or Firm* — Osha • Liang LLP (57) ABSTRACT

A lithium ion capacitor includes a positive electrode made of a material capable of reversibly carrying either one or both of a lithium ion and an anion, a negative electrode made of a material capable of reversibly carrying a lithium ion, and an electrolytic solution made of a non-protonic organic solvent electrolytic solution of a lithium salt. A negative electrode active material is non-graphitizable carbon having a ratio of number of hydrogen atoms to number of carbon atoms of zero or more and less than 0.05. The lithium ion is doped in advance to either one or both of the negative electrode and the positive electrode so that a negative electrode potential when a cell is discharged to a voltage one half a charging voltage of the cell is 0.15 V or less relative to a lithium ion potential.

13 Claims, 1 Drawing Sheet

OTHER PUBLICATIONS esp@cenet Patent Abstract WO2004097867 dated Nov. 11, 2004 (1 page).
esp@cenet Patent Abstract WO9630318 dated Oct. 3, 1996 (1 page).
esp@cenet Patent Abstract JP11297578 dated Oct. 29, 1999 (1 page).
esp@cenet Patent Abstract JP8107048 dated Apr. 23, 1996 (1 page).
esp@cenet Patent Abstract JP9055342 dated Feb. 25, 1997 (1 page).
esp@cenet Patent Abstract JP9232190 dated Sep. 5, 1997 (1 page).
esp@cenet Patent Abstract WO9833227 dated Jul. 30, 1998 (1 page).
Notification of Transmittal of Translation of the International Preliminary Report on Patentability (Chapter I or Chapter II of the Patent Cooperation Treaty) for International Application No. PCT/JP2006/320663, mailed on May 2, 2008 (8 pages).

* cited by examiner

FIG. 1

LITHIUM ION CAPACITOR

TECHNICAL FIELD

The present invention relates to a lithium ion capacitor that includes a positive electrode, a negative electrode and a non-protonic organic solvent electrolytic solution of a lithium salt as an electrolyte.

BACKGROUND ART

In recent years, a so-called lithium ion secondary battery that uses a carbon material such as graphite in a negative electrode and a lithium-containing metal oxide such as $LiCoO_2$ in a positive electrode, being high in the capacitance, as a potential electric storage device, is put into practical use as a main power supply mainly of a note book computer or a portable telephone. The lithium ion secondary battery is a so-called rocking chair type battery where, after assembling of the battery, a charge operation is carried out to supply a lithium ion from the lithium-containing metal oxide as the positive electrode to the negative electrode, and, in a discharge operation, the lithium ion at the negative electrode is returned to the positive electrode. The lithium ion secondary battery is characterized by having a high voltage and a high capacitance.

On the other hand, under a situation where the environmental problems come to the front, an electric storage device (a main power supply and an auxiliary power supply) for an electric car or hybrid car that substitutes for a gasoline vehicle has been actively developed. Furthermore, until recently, as an automobile electric storage device, a lead battery has been used. However, since electrical installations and instruments are fulfilling, from viewpoints of the energy density and output density, a new electric storage device is in demand.

As such a new electric storage device, the lithium ion secondary battery and an electric double layer capacitor are gathering attention. However, the lithium ion secondary battery, though high in the energy density, has problems with the output characteristics, the safety and the cycle lifetime. On the other hand, the electric double layer capacitor, which is utilized as a power supply for back-upping a memory such as an IC and LSI, is smaller in the discharge capacity per one charge than a battery. However, the electric double layer capacitor is provided with such high output characteristics and maintenance-free characteristics that are not found in the lithium ion secondary battery as that the instantaneous charge and discharge characteristics are excellent and several tens thousands cycles of charge and discharge can be withstood.

Although the electric double layer capacitor has such advantages, the energy density of an existing general electric double layer capacitor is substantially 3 to 4 Wh/l and is smaller by substantially two digits compared with that of the lithium ion secondary battery. When an electric car is considered, it is said that, in order to put into practical use, the energy density of 6 to 10 Wh/l is necessary, and, in order to popularize, the energy density of 20 Wh/l is necessary.

As an electric storage device that responds to such applications that necessitate the high energy density and high output characteristics, recently, an electric storage device called as well as a hybrid capacitor that combines electric storage principles of a lithium ion secondary battery and an electric double layer capacitor is gathering attention. The hybrid capacitor usually uses a polarizable electrode in a positive electrode and a non-polarizable electrode in a negative electrode and is gathering attention as an electric storage device that combines high energy density of a battery and high output characteristics of an electric double layer. On the other hand, in the capacitor, a capacitor is proposed in which a negative electrode that can store and release a lithium ion is brought into contact with metal lithium to allow storing and carrying (hereinafter, in some cases, referred to as doping) the lithium ion chemically or electrochemically in advance to lower a negative electrode potential, and, thereby, it is intended that the withstand voltage is heightened and the energy density is made remarkably larger (Patent literatures Nos. 1 through 4).

In the capacitor, though high performance can be expected, when a lithium ion is doped to a negative electrode, metal lithium has to be stuck to an entire negative electrode or it is possible to locally and partially dispose metal lithium in a cell to bring into contact with a negative electrode. However, there are problems in that the doping takes a very long time and cannot be uniformly applied over an entire negative electrode. It is considered difficult to put into practical use in a large and high capacity cell such as, in particular, a cylindrical device where electrodes are wound or a rectangular battery where a plurality of sheets of electrodes is laminated.

However, the problems were overcome at one stroke owing to an invention in that when a hole that penetrates through front and back of a negative electrode current collector and a positive electrode current collector that constitute a cell is disposed to allow a lithium ion moving through the through-hole and simultaneously the metal lithium that is a supply source of the lithium ion and the negative electrode are short-circuited, only by disposing the metal lithium at an end of the cell, the lithium ion can be doped over an entire negative electrode in the cell (Patent literature 5). The lithium ion is usually doped to the negative electrode. However, it is disclosed in the patent literature 5 that even when the lithium ion is doped to the positive electrode together with the negative electrode or in place of the negative electrode, a situation is same.

Thus, even in a large and high capacity cell such as a cylindrical electric storage device where electrodes are wound or a rectangular electric storage device where a plurality of sheets of electrodes is laminated, to an entire negative electrode in the device, in short time and uniformly over an entire negative electrode, the lithium ion can be doped to improve the withstand voltage and thereby to drastically increase the energy density. As the result, a prospect of realizing a capacitor that has high output density that the electric double layer capacitor intrinsically has and high capacitance is obtained.

However, in order to put such high capacitance capacitors into practical use, together with higher withstand voltage, higher capacitance, higher energy density and lower internal resistance, the long term sustainability of the characteristics are further in demand.

[Patent literature 1] JP-A-08-107048
[Patent literature 2] JP-A-09-055342
[Patent literature 3] JP-A-09-232190
[Patent literature 4] JP-A-11-297578
[Patent literature 5] WO98/033227

The invention intends to provide, in a lithium ion capacitor where a positive electrode active material is a material that can reversibly carry a lithium ion and/or anion, a negative electrode active material is a material that can reversibly carry a lithium ion, and a negative electrode and/or a positive electrode is brought into contact electrochemically with a lithium ion supply source to dope the lithium ion in the negative electrode in advance, a lithium ion capacitor that has, together with higher withstand voltage, higher capacitance, higher energy density and lower internal resistance, excellent endurance of sustaining the characteristics over a long term.

DISCLOSURE OF THE INVENTION

One or more embodiments of the invention provide a lithium ion capacitor where a negative electrode and/or a positive electrode is brought into contact electrochemically with a lithium ion supply source to dope the lithium ion in the negative electrode in advance, wherein as a negative electrode active material, non-graphitizable carbon that has a ratio of numbers of hydrogen atoms to carbon atoms in a particular small range is used, and, when the lithium ion is doped to the negative electrode and/or the positive electrode in advance so that a negative electrode potential when a cell is discharged to a voltage one half the charging voltage of the cell may be a predetermined value equal to or less than a metal lithium potential, a lithium ion capacitor higher in the withstand voltage, capacitance and energy density and lower in the internal resistance and excellent in the endurance of sustaining the characteristics over a long term is provided.

According to one or more embodiments of the invention, in (1) a lithium ion capacitor provided with a positive electrode made of a material capable of reversibly carrying lithium ion and/or anion, a negative electrode made of a material capable of reversibly carrying lithium ion and a non-protonic organic solvent electrolytic solution of a lithium salt as an electrolytic solution, (a) a negative electrode active material is non-graphitizable carbon that has a ratio of numbers of hydrogen atoms to carbon atoms of zero or more and less than 0.05 and (b) the lithium ion is doped in advance to a negative electrode and/or a positive electrode so that a negative electrode potential when the cell is discharged to a voltage one half the charging voltage of the cell may be 0.15 V or less to a metal lithium potential.

Furthermore, in the lithium ion capacitor of (1), (2) the lithium ion may be doped to the negative electrode and/or positive electrode in the range of 400 to 600 mAh/g per weight of the negative electrode active material.

Still furthermore, in the lithium ion capacitor of (1) or (2), (3) the positive electrode and/or negative electrode, respectively, is provided with a current collector having a hole penetrating through between front and back surfaces and the negative electrode and/or positive electrode may come into contact electrochemically with a lithium ion supply source to dope the lithium ion to the negative electrode and/or positive electrode.

In the lithium ion capacitor of any one of (1) through (3), (4) the negative electrode active material may have the capacitance per unit weight of three times or more larger than that of the positive electrode active material and a weight of the positive electrode active material may be larger than that of the negative electrode active material.

Furthermore, in the lithium ion capacitor of any one of (1) through (4), (5) the positive electrode active material may be a polyacene organic semiconductor that is a pyrolysis product of active carbon or an aromatic condensate polymer and has a polyacene skeleton structure where a ratio in number of hydrogen atoms and carbon atoms is in the range of 0.05 to 0.50.

According to one or more embodiments of the invention, in a lithium ion capacitor where lithium ion is doped in advance to the negative electrode and/or positive electrode, a lithium ion capacitor that has the withstand voltage such a high voltage as 4.0 V or more, can obtain higher capacitance, higher energy density and lower internal resistance and can sustain the characteristics over a long term can be provided. The mechanism by which the characteristics can be obtained is supposed as follows.

The reason why the withstand voltage of a cell becomes lower when charge and discharge are repeated is mainly in that an electrolytic solution is decomposed on a positive electrode side during the charge. Accordingly, the lower the positive electrode potential during the charge is, the higher the endurance as a cell becomes. In the case of a carbon material being used as a negative electrode active material, when the lithium ion is doped (charged), the potential is gradually lowered, and, when the lithium ion is dedoped, the potential goes up. The relationship between an amount of lithium ion doped or dedoped and the potential is different dependent on a kind of carbon material. Non-graphitizable carbon that has a ratio in number of hydrogen atoms and carbon atoms of zero or more and less than 0.05 is a material that can dope and dedope the lithium ion at a potential lower than that of other carbon materials. Accordingly, in a lithium ion capacitor that has such non-graphitizable carbon in the negative electrode, since, even when a cell voltage is raised, a negative electrode potential is lower than a lithium ion capacitor that uses other carbon material as the negative electrode active material, the positive electrode potential becomes lower to result in heightening the endurance.

Furthermore, the discharge depth affects on the endurance. That is, when the discharge depth is made shallower, the endurance can be improved. Since a capacitor that is used in a hybrid car is said to use to a voltage one half the charging voltage, in a capacitance that is discharged (complete discharge) to a voltage one half the charging voltage, high endurance is demanded. In the invention, when the negative electrode potential at the complete discharge is set at 0.15 V or less, the energy density can be improved. However, since, though the discharge depth of the cell is deep, the discharge depth as the negative electrode material is shallow, the cell can be heightened in the endurance when the cell is used under a high voltage.

BEST MODE FOR CARRYING OUT THE INVENTION

A lithium ion capacitor (hereinafter, in some cases, simply referred to as a cell) of the invention includes a positive electrode, a negative electrode and a non-protonic organic electrolytic solution of a lithium salt as an electrolytic solution, a positive electrode active material being a material capable of reversibly carrying lithium ion and/or anion, a negative electrode active material being a material capable of reversibly carrying lithium ion. Here, the "positive electrode" is an electrode on a side therefrom a current flows out at the discharge and the "negative electrode" is an electrode on a side therein the current flows at the discharge.

In the lithium ion capacitor like this, in the invention, as a negative electrode active material, non-graphitizable carbon having a ratio of numbers of hydrogen atoms to carbon atoms (hereinafter, in some cases, referred to as a H/C ratio) in the range of zero or more and less than 0.05 is used. As the non-graphitizable carbon, without restricting the kind to particular one, for instance, phenol resin carbon, furan resin carbon and infusible pitch carbon can be cited, among these, the phenol resin being particularly preferred. When, as the negative electrode active material, as shown in comparative example 3 described below, in the case of a polyacene substance (PAS) formed by carbonizing, for instance, a phenol resin that is a material of which H/C ratio exceeds 0.05 being used to heighten a voltage, even when an amount of pre-doped lithium ion is increased to lower the negative electrode potential, while an initial capacitance value and the energy density are large, during a long use, a gas is generated in the cell. That is, the object of the invention cannot be achieved.

As the negative electrode active material, even the non-graphitizable carbon, in the case of the H/C ratio exceeding 0.05, cannot be sufficiently carbonized, and thereby the object cannot be achieved. The H/C ratio is preferred to be smaller; however, when the H/C ratio is too small, the calcination temperature becomes higher to result in high cost; accordingly, 0.003 or more is preferred. Above all, the H/C ratio is preferred to be in the range of 0.003 to 0.02.

The particle size characteristics of the negative electrode active material of the invention are derived of particles of negative electrode active material of which 50% volume cumulative diameter (called also as D50) is in the range of 0.5 to 30 μm. The D50 is preferably in the range of 0.5 to 15 μm and particularly preferably in the range of 0.5 to 6 μm. Furthermore, the particles of the negative electrode active material of the invention have the specific surface area in the range of 0.1 to 2000 $m^2/g$, preferably in the range of 0.1 to 1000 $m^2/g$ and particularly preferably in the range of 0.1 to 600 $m^2/g$.

On the other hand, as the positive electrode active material that is used in the lithium ion capacitor of the invention, as far as it is a material that can reversibly carry lithium ion and anion such as tetrafluoroborate, various kinds can be used. For instance, activated carbon or a polyacene organic semiconductor (PAS) that is a pyrolysis product of an aromatic condensate polymer and has a polyacene skeleton structure where a ratio of numbers of hydrogen atoms and carbon atoms is in the range of 0.05 to 0.50 is preferred.

As the positive electrode active material, a wide range of particle sizes can be used. For instance, the D50 is 2 μm or more, preferably in the range of 2 to 50 μm and particularly preferably in the range of 2 to 20 μm. Furthermore, an average pore diameter is preferably 10 nm or less and the specific surface area is preferably in the range of 600 to 3000 $m^2/g$ and particularly preferably in the range of 1300 to 2500 $m^2/g$.

The PAS that is used as the positive electrode active material, having an amorphous structure, does not exhibit a structural change such as swelling and contraction at the doping and dedoping of the lithium ion that occurs at 3 V or less relative to the metal lithium potential to be excellent in the cycle characteristics. Furthermore, the PAS, having a molecular structure (higher structure) isotropic to the doping and dedoping of the lithium ion, is preferably excellent in the rapid charging and rapid discharge as well. The aromatic condensate polymer that is a precursor of the PAS is a condensate between an aromatic hydrocarbon compound and aldehyde. As the aromatic hydrocarbon compound, so-called phenols such as phenol, cresol and xylenol can be preferably used.

For instance, methylene/bisphenols, expressed by a formula below

[formula 1]

(here, x and y, respectively and independently, express 0, 1 or 2) or hydroxy/biphenyls or hydroxynaphthalenes can be used. Above all, phenols are preferable.

Furthermore, as the aromatic condensate polymer, a modified aromatic condensate polymer in which an aromatic hydrocarbon compound having the phenolic hydroxyl group is partially substituted with an aromatic hydrocarbon compound that does not have a phenolic hydroxyl group such as xylene, toluene or aniline such as a condensate of phenol, xylene and formaldehyde can be used as well. Still furthermore, a modified aromatic polymer that is substituted with melamine or urea can be used and a furan resin is preferred as well.

In the invention, the PAS is produced as follows. That is, when the aromatic condensate polymer is gradually heated up to an appropriate temperature in the range of 400 to 800° C. under a non-oxidizing atmosphere (including vacuum atmosphere), an insoluble and infusible base material having the H/C ratio in the range of 0.05 to 0.50 and preferably in the range of 0.10 to 0.35 can be obtained.

The insoluble and infusible base material, according to the X-ray diffractometry (Cu Kα), has a main peak at a position of 24° or less by 2θ and, other than the main peak, another broad peak in the range of 41 through 46°. That is, the insoluble and infusible base material has a polyacene skeleton structure where an aromatic polycyclic structure is appropriately developed and an amorphous structure; accordingly, the insoluble and infusible base material can stably dope and dedope the lithium ion.

In the invention, when a positive electrode and/or a negative electrode, respectively, are formed from the negative electrode active material and/or the positive electrode active material, as a process thereof, known processes can be used. That is, a powder of an electrode active material, a binder and, as needs arise, a conductive powder are dispersed in an aqueous or organic solvent to prepare a slurry, the slurry is coated on a current collector that is used as needs arise or the slurry may be formed in advance into a sheet, followed by sticking the sheet to a current collector. As the binder used here, for instance, rubber binders such as SBR and NBR; fluorine-containing resins such as polytetrafluoroethylene and polyvinylidene fluoride; and thermoplastic resins such as polypropylene, polyethylene and polyacrylate can be used. The binder is preferably added, though different depending on the conductivities of electrode active materials and shapes of the electrodes, at a ratio in the range of 2 to 40 parts by weight to 100 parts by weight of the electrode active material. As the conductive materials, acetylene black, graphite and metal powder can be cited.

The conductive material that is used in the above as needs arise is preferably added, though different depending on the conductivities of electrode active materials and shapes of the electrodes, at a ratio in the range of 2 to 40 parts by weight and particularly preferably in the range of 5 to 10 parts by weight to 100 parts by weight of the electrode active material.

As the non-protonic organic solvent that forms a non-protonic organic solvent electrolytic solution in the lithium ion capacitor of the invention, for instance, ethylene carbonate, propylene carbonate, dimethyl carbonate, diethyl carbonate, γ-butyrolactone, acetonitrile, dimethoxyethane, tetrahydrofuran, dioxolane, methylene chloride and sulfolane can be cited. Furthermore, at least two kinds of the non-protonic organic solvents may be mixed and used.

Furthermore, as an electrolyte that is dissolved in a single or mixture solvent, all electrolytes that can produce lithium ion can be used. Examples of such electrolytes include $LiClO_4$, $LiAsF_6$, $LiBF_4$, ($LiPF_6$, Li ($C_2F_5SO_2$)$_2$N and Li ($CF_3SO_2$)$_2$N. The electrolyte and solvent are mixed after sufficiently dewatered to form an electrolytic solution. A concentration of the electrolyte in the electrolytic solution, in order to lower the internal resistance owing to the electrolytic solution, is preferably set at 0.1 mol/l or more and more preferably in the range of 0.5 to 1.5 mol/l.

Still furthermore, the lithium ion capacitor of the invention is suitable particularly for a large capacitance cell such as a winding type cell in which a belt-like positive electrode and a belt-like negative electrode are wound through a separator, a laminate type cell formed by laminating each of three or more planar positive electrodes and each of three or more planar negative electrodes through a separator or a film type cell where a laminated body formed by laminating each of three or more planar positive electrodes and each of three or more planar negative electrodes through a separator is sealed in an exterior film. The cell structures all are known in WO00/07255, WO03/003395 and JP-A-2004-266091 and the capacitor cell of the invention as well can be formed in a constitution same as that of existing cells.

In the lithium ion capacitor of the invention, after the lithium ion is doped to the negative electrode and/or positive electrode, the cell is charged. The lithium ion is necessarily doped so that the negative electrode potential when the cell is discharged to a voltage one half the charging voltage of the cell may be 0.15 V or less to the metal lithium potential. Here, to discharge to a voltage one half the charging voltage of the cell is defined as a case where the discharge is applied at a current by which the voltage becomes one half over more than 1 hr. Furthermore, when the negative electrode potential is measured, it is measured within 1 hr after the discharge. When such the negative electrode potential exceeds 0.15 V versus the metal lithium potential, although an initial capacitance and energy density are large, after the charge and discharge are repeated over a long term, the capacitance is deteriorated to be poor in the endurance.

In the lithium ion capacitor of the invention, when the lithium ion is doped so that the negative electrode potential when the discharge is applied to a voltage one half the charging voltage of the cell may be 0.15 V or less versus the metal lithium potential, a doping operation of the lithium ion is preferably carried out as follows. As one means thereof, the lithium ion is doped to the negative electrode and/or positive electrode so as to be preferably in the range of 400 to 600 mAh/g and particularly preferably in the range of 450 to 550 mAh/g per weight of the negative electrode active material. When the dope amount is smaller than 400 mAh/g, the energy density of the cell is deteriorated. On the other hand, when it exceeds 600 mAh/g, since it is close to the limit of the lithium ion doping capacity, the metal lithium inconveniently tends to separate out. However, the negative electrode potential at the time of discharge is determined depending on a weight balance between the positive electrode active material and the negative electrode active material. For instance, even when the dope amount is 500 mAh/g, in the case where an amount of the negative electrode active material is very small to an amount of the positive electrode active material, the negative electrode potential may be 0.15 V or more. Accordingly, not only the dope amount but also a weight balance between the positive electrode active material and the negative electrode active material has to be taken into consideration.

In the lithium ion capacitor of the invention, when the negative electrode potential is made 0.15 V or less to the metal lithium potential, utilization capacitance of the positive electrode becomes higher to be high capacitance and thereby large energy density can be obtained. As a supply amount of the lithium ion increases, the negative electrode potential becomes lower, the endurance is improved and the energy density is improved. In order to obtain further higher withstand voltage and the energy density, to the metal lithium potential, the negative electrode potential is preferably 0.12 V or less and particularly preferably 0.09 V or less.

In the invention, the lithium ion may be doped to either one or both of the negative electrode and the positive electrode. However, in the case of for instance activated carbon being used in the positive electrode, when the dope amount of the lithium ion becomes too much to be low in the positive electrode potential, in some cases, the lithium ion is irreversibly consumed to inconveniently deteriorate the capacitance of the cell. Accordingly, by considering the respective electrode active materials, the lithium ion is preferably doped to the negative electrode and the positive electrode so as not to cause these inconveniences. In the invention, since it is troublesome, from process viewpoint, to control a dope amount of the positive electrode and a dope amount of the negative electrode, the lithium ion is preferably doped to the negative electrode.

In the lithium ion capacitor of the invention, in particular, when the capacitance per weight of the negative electrode active material is three times or more the capacitance per weight of the positive electrode active material and weight of the positive electrode active material is set larger than weight of the negative electrode active material, a high voltage and high capacitance capacitor can be obtained. Furthermore, simultaneously therewith, when a negative electrode having the capacitance per weight larger than the capacitance per weight of the positive electrode is used, without changing a variation amount of the potential of the negative electrode, weight of the negative electrode active material can be reduced; accordingly, a filling amount of the positive electrode active material can be made larger to result in making the capacitance and the capacity of the cell larger.

In the invention, the capacitance and the capacity of a capacitor cell are defined as shown below. The capacitance of a cell shows an electric quantity (gradient of a discharge curve) flowing to a cell per voltage of the cell and has a unit of F (farad). The capacitance per weight of a cell is shown by a quotient obtained by dividing the capacitance of the cell by a total weight of weight of the positive electrode active material and weight of negative electrode active material filled in the cell and has a unit of F/g. Furthermore, the capacitance of the positive electrode or the negative electrode shows an electric quantity (gradient of a discharge curve) flowing to a cell per voltage of the positive electrode or the negative electrode and has a unit of F. The capacitance per weight of the positive electrode or the negative electrode is shown by a quotient obtained by dividing the capacitance of the positive electrode or the negative electrode by weight of the positive electrode active material or negative electrode active material filled in the cell and has a unit of F/g.

Furthermore, the cell capacity is a product of difference of a discharge start voltage and a discharge end voltage of a cell, that is, a variation of voltage and the capacitance of the cell, and has a unit of C (Coulomb). However, since 1 C is an amount of electric charge when a current of 1 A flows during 1 second, in the invention, the cell capacitance is expressed in terms of mAh. The positive electrode capacity is a product of difference of the positive electrode potential at the discharge start time and the positive electrode potential at the time of discharge end (variation of positive electrode potential) and the capacitance of the positive electrode, and has a unit of C or mAh. Similarly, the negative electrode capacity is a product of difference of the negative electrode potential at the time of discharge start time and the negative electrode potential at the time of discharge end (variation of negative electrode potential) and the capacity of the negative electrode, and has a unit of C or mAh. The cell capacity, the positive electrode capacity and the negative electrode capacity coincide with each other.

In the lithium ion capacitor of the invention, means for doping the lithium ion to the negative electrode and/or positive electrode in advance are not particularly restricted. For instance, a lithium ion supply source such as metal lithium that can supply the lithium ion can be disposed as a lithium electrode in a capacitor cell. An amount of the lithium ion supply source (weight of metal lithium and the like) may be enough when predetermined capacity of the negative electrode can be obtained. In this case, the negative electrode and the lithium electrode may be physically brought into contact (short-circuiting) or the lithium ion may be electrochemically doped. The lithium ion supply source may be formed on a current collector of the lithium electrode, which is made of a conductive porous body. As the conductive porous body that becomes a current collector of the lithium electrode, a metallic porous body such as a stainless mesh that does not react with the lithium ion supply source can be used.

In a large capacity multi-layer structure capacitor cell, a positive electrode current collector and a negative electrode current collector that receive and deliver electricity from and to the positive electrode and the negative electrode, respectively, are provided. When such the positive electrode current collector and negative electrode current collector are used and a lithium electrode is disposed, it is preferred that the lithium electrode is disposed at a position that faces the negative electrode current collector to electrochemically supply the lithium ion to the negative electrode. In this case, as the positive electrode current collector and negative electrode current collector, a material provided with throughholes connecting front and back surfaces such as an expanded metal is used, and the lithium electrode is disposed faced to the negative electrode and/or positive electrode. The throughholes, without restricting to particular shape and the number thereof, can be disposed so that lithium ion in an electrolytic solution described below may move between front and back surfaces of the electrode without being blocked by the electrode current collector.

In the lithium ion capacitor of the invention, even when the lithium electrode that dopes the negative electrode and/or positive electrode is locally disposed in the cell, the lithium ion can be uniformly doped. Accordingly, even in the case of a large capacity cell in which a positive electrode and a negative electrode are laminated or wound, when the lithium electrode is partially disposed at the outermost periphery or on the outermost side of the cell, the lithium ion can be smoothly and uniformly doped to the negative electrode.

As a material of the electrode current collector, various kinds of materials generally proposed for lithium base batteries can be used. That is, in the positive electrode current collector, aluminum or stainless steel can be used, and, in the negative electrode current collector, stainless steel, copper or nickel can be used. Furthermore, a lithium ion supply source when the lithium ion is doped through an electrochemical contact with the lithium ion supply source disposed in the cell is a material that at least contains a lithium element and can supply the lithium ion like metal lithium or a lithium-aluminum alloy.

In what follows, the invention will be specifically described with reference to examples. However, it goes without saying that the invention is not restricted to the examples.

Example 1

Producing Method of Negative Electrode 1

In the beginning, furfuryl alcohol that is a raw material of furan resin carbon was held at 60° C. for 24 hr to harden, and thereby a black resin was obtained. The obtained black resin was put into a stationary electric furnace, heated up to 1200° C. in a nitrogen atmosphere in 3 hr and kept there for 2 hr. A sample taken out after leaving to cool was pulverized by use of a ball mill and a sample 1 that is non-graphitizable carbon powder (H/C ratio: 0.008), which has the D50 of 5.0 μm was obtained.

In the next place, 100 parts by weight of the sample 1 and a solution where 10 parts by weight of polyvinylidene fluoride powder was dissolved in 80 parts by weight of N-methylpyrrolidone were thoroughly mixed to prepare a negative electrode slurry 1. The negative electrode slurry 1 was coated on one surface of a copper foil having a thickness of 18 μm so as to be substantially 7 mg/cm$^2$ as a solid content, followed by drying and pressing, and thereby a negative electrode 1 was obtained.

(Measurement of Capacitance Per Unit Weight of Negative Electrode 1)

From the negative electrode 1, four sheets having a size of 1.5 cm×2.0 cm were cut and used as evaluation negative electrode. The negative electrode and metal lithium having a size of 1.5 cm×2.0 cm and a thickness of 200 μm as a counter electrode were assembled through a polyethylene non-woven fabric having a thickness of 50 μm as a separator to prepare a simulated cell. As a reference electrode, metal lithium was used. As an electrolytic solution, a solution obtained by dissolving $LiPF_6$ in propylene carbonate at a concentration of 1 mol/l was used.

To unit weight of a negative electrode active material, at a charge current of 1 mA, lithium ions equivalent to 150, 300, 400 and 500 mAh/g were charged, followed by discharging to 1.5 V at 1 mA. From a potential variation from the discharge start to 50 mAh discharge and a discharge time, the capacitance per unit weight of the negative electrode 1 was obtained. Results are shown in Table 1.

TABLE 1

| Charging Amount (mAh/g) | 150 | 300 | 400 | 500 |
|---|---|---|---|---|
| Capacitance per unit weight of negative electrode 1 (F/g) | 500 | 1200 | 2222 | 4286 |

Here, the charging amount is a value obtained by dividing a cumulative value of a charging current flowed to the negative electrode by weight of the negative electrode active material and has a unit of mAh/g.

(Producing Method of Negative Electrode 2)

On both surfaces of a copper expanded metal (produced by Nippon Metal Industry Co., Ltd.) that has a thickness of 26

μm (porosity: 54%) and where LW:SW:W=1.3:0.65:0.136, the negative electrode slurry 1 was vertically coated at a speed of 1 m/rain by use of a die coater, followed by forming, further followed by pressing, and thereby a negative electrode 2 having a thickness of an entire negative electrode (sum total of thicknesses of electrode layers on both surfaces of the negative electrode and a layer thickness of a negative electrode current collector) of 113 μm was obtained.

(Producing Method of Positive Electrode 1)

To 92 parts by weight of commercially available activated charcoal (D50=6 μm and specific surface area: 1970 m$^2$/g) powder, 6 parts by weight of acetylene black powder, 5 parts by weight of a copolymer of methyl acrylate and acrylonitrile (emulsion having a copolymerization molar ratio of the former to the latter=7/3, solid content: 40% by weight, Tg: −40° C., viscosity: 50 mPa·s and pH: 8.0), 4 parts by weight of carboxylmethyl cellulose (CMC) and 200 parts by weight of ion-exchanged water were added, followed by thoroughly mixing by use of an agitator, and thereby a slurry was obtained. The slurry was coated on one surface of a 20 μm thickness aluminum foil coated by a carbon-based conductive paint so as to be substantially 7 mg/cm$^2$ as a solid content, followed by drying and pressing, and thereby a positive electrode 1 was obtained.

(Measurement of Capacitance Per Unit Weight of Positive Electrode 1)

From the positive electrode 1, four sheets having a size of 1.5 cm×2.0 cm were cut and used as evaluation positive electrode. The positive electrode and metal lithium having a size of 1.5 cm×2.0 cm and a thickness of 200 μm as a counter electrode were assembled through a polyethylene nonwoven fabric having a thickness of 50 μm as a separator to prepare a simulated cell. As a reference electrode, metal lithium was used. As an electrolytic solution, a solution obtained by dissolving $LiPF_6$ in propylene carbonate at a concentration of 1 mol/l was used.

After charging to 3.6 V at a charging current of 1 mA, the constant voltage charging was applied, and, after a total charging time of 1 hr, the discharge was carried out to 2.5 V at 1 mA. From the discharging time between 3.5 V to 2.5 V, the capacitance per unit weight of the positive electrode 1 was obtained and found to be 95 F/g.

(Producing Method of Positive Electrode 2)

On both surfaces of an aluminum expanded metal (produced by Nippon Metal Industry Co., Ltd.) that has a thickness of 38 μm (porosity: 45%) and where LW:SW:W=1.0: 0.52:0.143, a non-aqueous carbon base conductive paint (trade name: EB-815, produced by Acheson (Japan) Ltd.) was coated by use of a spray coating method, followed by drying, and thereby a positive electrode current collector on which a conductive layer was formed was obtained. A total thickness (sum total of a thickness of a current collector and a thickness of a conductive layer) was 52 μm and the throughhole was substantially clogged by the conductive paint. The slurry of the positive electrode 1 was coated on one surface of the positive electrode current collector at a speed of 2 m/min by use of a roll coater and dried, followed by horizontally coating on the other surface at a speed of 2 m/min by use of a roll coater, further followed by drying and pressing, and thereby a positive electrode 2 having a total thickness (sum total of thicknesses of electrode layers on both surfaces of the positive electrode, thicknesses on both surfaces of the conductive layer and a thickness of a positive electrode current collector) of 281 μm was obtained.

(Preparation of Electrode Laminated Unit)

The negative electrode 2 having a thickness of 113 μm and the positive electrode having a thickness of 281 μm, respectively, were cut to a size of 6.0 cm×7.5 cm (excluding a terminal welding portion). A cellulose/rayon mixed non-woven fabric having a thickness of 35 μm was used as a separator. The terminal welding portions of the positive electrode current collector and negative electrode current collector were disposed so as to be on opposite sides to each other. These were laminated so that the number of surfaces through which the positive electrode and the negative electrode face may amount to 20 layers and the outermost electrode of the laminated electrode may be a negative electrode. On the uppermost portion and lowermost portion, the separators were disposed, four sides were fastened with a tape, and the terminal welding portion of the positive electrode current collector (10 sheets) and the terminal welding portion of the negative electrode current collector (11 sheets), respectively, were welded by ultrasonic to an aluminum positive electrode terminal and a copper negative electrode terminal having a width of 50 mm, a length of 50 mm and a thickness of 0.2 mm, and thereby an electrode laminated unit was obtained. Incidentally, 10 sheets of the positive electrode and 11 sheets of the negative electrode were used. The weight of the positive electrode active material was 1.3 times the weight of the negative electrode active material.

(Preparation of Cell 1)

As a lithium electrode, one obtained by pressure bonding a metal lithium foil (thickness: 95 μm, 6.0 cm×7.5 cm, equivalent to 250 mAh/g) to a stainless mesh having a thickness of 80 μm was used. One of the lithium electrode sheets was disposed on each of an upper portion and a bottom portion of an electrode laminated unit so as to completely face the negative electrode at the outermost portion, and thereby a three-electrode-laminated unit was obtained. The terminal welding portions (2 sheets) of the lithium electrode current collector were resistance welded to the negative electrode terminal welding portions.

The three-electrode-laminated unit was disposed inside of an exterior film that was deep drawn by 5.8 mm and covered with an exterior laminate film, followed by fusing three sides. After the fusing, as an electrolytic solution, a solution in which in a mixture solvent where ethylene carbonate, diethyl carbonate and propylene carbonate were mixed at a weight ratio of 3:4:1, $LiPF_6$ was dissolved at a concentration of 1 mol/l was impregnated under vacuum, followed by fusing a remaining one side, and thereby four film type cells 1 were assembled. The metal lithium disposed in the cell was equivalent to 500 mAh/g per weight of the negative electrode active material.

(Initial Evaluation of Cell)

When one cell was left for 20 days after assembling the cell and disassembled, the metal lithium was found completely disappeared in all. Accordingly, it was judged that lithium ion for obtaining capacitance of 4286 F/g or more per unit weight of the negative electrode active material was doped by charging in advance. The electrostatic capacitance of the negative electrode amounts to 45 times the electrostatic capacitance of the positive electrode.

Furthermore, another cell was charged under a constant current of 2500 mA to a cell voltage of 4.0 V, followed by carrying out a constant current-constant voltage charge where a constant voltage of 4.0 V was applied for 1 hr. In the next place, the discharge was carried out over 1 hr under a constant current to a cell voltage of 2.0 V. Within 1 hr after the discharge came to completion, the cell was disassembled, and the negative electrode potential was measured and found to be 0.07 V.

(Characteristics Evaluation of Cell)

Remaining two cells were charged under a constant current of 2500 mA to a cell voltage of 4.0 V, followed by applying a constant current-constant voltage charge where a constant voltage of 4.0 V is applied for 1 hr. In the next place, under a constant current of 250 mA, the discharge was carried out to a cell voltage of 2.0 V. The discharge cycle of 4.0 V-2.0 V was repeatedly applied and, in the tenth discharge, the cell capacity and the energy density were evaluated. Furthermore, as the endurance test, in a thermostat set at 60° C., a voltage of 4.0 V was continuously applied for 1000 hr, followed by leaving to cool to room temperature, further followed by measuring the capacity. The cell after the endurance test was free from inconveniences such as the gas generation and did not show deformation. Results are shown in Table 2. Data are average values of two cells.

TABLE 2

|  | Initial capacity (mAh) | Energy density (Wh/l) | Capacity after endurance test (mAh) | Capacity retention rate (%) |
|---|---|---|---|---|
| Example 1 | 242 | 18.5 | 232 | 95.9 |

Comparative Example 1

Preparation of Cell 2

Except that, as a lithium electrode, one obtained by pressure bonding a metal lithium foil (thickness: 58 μm, 6.0 cm×7.5 cm, equivalent to 150 mAh/g) to a stainless mesh having a thickness of 80 μm was used, similarly to example 1, four film type cells 2 were assembled. The metal lithium disposed in the cell corresponds to 300 mAh/g per unit weight of negative electrode active material and a weight of the positive electrode active material was 1.2 times that of the negative electrode active material.

When one cell was left for 20 days after assembling the cell and disassembled, the metal lithium was found completely disappeared in all. Accordingly, it was judged that lithium ion for obtaining capacitance of 1200 F/g or more per unit weight of the negative electrode active material was doped by charging in advance. The capacitance of the negative electrode amounts to 12.6 times the capacitance of the positive electrode.

Furthermore, another cell was charged under a constant current of 2000 mA to a cell voltage of 4.0 V, followed by carrying out a constant current-constant voltage charge where a constant voltage of 4.0 V was applied for 1 hr. In the next place, the discharge was carried out over 1 hr under a constant current to a cell voltage of 2.0 V. Within 1 hr after the discharge came to completion, the cell was disassembled, and the negative electrode potential was measured and found to be 0.20 V.

Remaining two cells were charged under a constant current of 2000 mA to a cell voltage of 4.0 V, followed by applying a constant current-constant voltage charge where a constant voltage of 4.0 V is applied for 1 hr. In the next place, under a constant current of 200 mA, the discharging was carried out to a cell voltage of 2.0 V. The discharge cycle of 4.0 V-2.0 V was repeatedly applied and, in the tenth discharge, the cell capacity and the energy density were evaluated. Furthermore, as the endurance test, in a thermostat set at 60° C., a voltage of 4.0 V was continuously applied for 1000 hr, followed by leaving to cool to room temperature, further followed by measuring the capacity. The cell after the endurance test was free from inconveniences such as the gas generation and did not deform. Results are shown in Table 3. Data are average values of two cells.

TABLE 3

|  | Initial capacityt (mAh) | Energy density (Wh/l) | Capacity after endurance test (mAh) | Capacity retention rate (%) |
|---|---|---|---|---|
| Comparative Example 1 | 207 | 16.7 | 184 | 88.9 |

When example 1 and comparative example 1 are compared, since both were doped with the lithium ion in advance in the negative electrode, both are preferably high in the energy density and free from inconveniences such as the gas generation after the endurance test. It is considered that since the potential of the non-graphitizable carbon that is used in the negative electrode is low, even when the cell is charged to 4.0 V and used, the positive electrode potential does not become too high and there is no reaction with the electrolytic solution. Among these, example 1 where the lithium ion is doped in advance to the negative electrode so that the negative electrode potential when the discharge is applied to a voltage one half the charging voltage of the cell may be 0.15 V or less to the metal lithium potential is more preferred because the capacity retention rate after the endurance test is larger than comparative example 1 where the negative electrode potential when the discharging is applied to a voltage one half the charging voltage of the cell is larger by 0.15 V than the metal lithium potential.

Example 2

Preparation of Cell 3

Except that, as a lithium electrode, one obtained by pressure bonding a metal lithium foil (thickness: 77 μm, 6.0 cm×7.5 cm, equivalent to 200 mAh/g) to a stainless mesh having a thickness of 80 μm was used, similarly to example 1, four film type cells 3 were assembled. The metal lithium disposed in the cell corresponds to 400 mAh/g per unit weight of negative electrode active material and a weight of the positive electrode active material was 1.8 times that of the negative electrode active material.

When one cell was left for 20 days after assembling the cell and disassembled, the metal lithium was found completely disappeared in all. Accordingly, it was judged that lithium ion for obtaining electrostatic capacitance of 2222 F/g or more per unit weight of the negative electrode active material was doped. The capacitance of the negative electrode amounts to 23 times the capacitance of the positive electrode.

Furthermore, another cell was charged under a constant current of 2000 mA to a cell voltage of 4.0 V, followed by carrying out a constant current-constant voltage charging where a constant voltage of 4.0 V was applied for 1 hr. In the next place, the discharge was carried out over 1 hr under a constant current to a cell voltage of 2.0 V. Within 1 hr after the discharge came to completion, the cell was disassembled, and the negative electrode potential was measured and found to be 0.12 V.

Remaining two cells were charged under a constant current of 2000 mA to a cell voltage of 4.0 V, followed by applying a constant current-constant voltage charge where a constant voltage of 4.0 V is applied for 1 hr. In the next place, under a constant current of 200 mA, the discharge was carried out to a cell voltage of 2.0 V. The discharge cycle of 4.0 V-2.0 V was repeatedly applied and, in the tenth discharge, the cell capacity and the energy density were evaluated. Furthermore, as the endurance test, in a thermostat set at 60° C., a voltage of 4.0 V was continuously applied for 1000 hr, followed by leaving to cool to room temperature, further followed by measuring the capacity. The cell after the endurance test was free from inconveniences such as the gas generation and did not show deformation. Results are shown in Table 4. Data are average values of two cells.

TABLE 4

| | Initial capacity (mAh) | Energy density (Wh/l) | Capacity after endurance test (mAh) | Capacity retention rate (%) |
|---|---|---|---|---|
| Example 2 | 236 | 18.2 | 220 | 93.3 |

When the lithium ion of 400 mAh/g was doped to the negative electrode active material, similarly to example 1, the negative electrode potential when the cell is discharged to a voltage one half the charging voltage of the cell becomes 0.15 V or less to the metal lithium potential. Accordingly, a lithium ion capacitor high in the capacity and energy density and excellent in the endurance could be obtained.

Example 3

Producing Method of Positive Electrode 3

Except that an entire thickness of a positive electrode after pressing (sum total of thicknesses of electrode layers on both surfaces of the positive electrode, thicknesses of conductive layers on both surfaces and a thickness of a positive electrode current collector) was set at 165 µm, similarly to example 1, a positive electrode 3 was obtained.
(Preparation of Cell 4)

Except that 20 sheets of positive electrode 3, 21 sheets of negative electrode 2, as a lithium electrode, one obtained by pressure bonding a metal lithium foil (thickness: 155 µm, 6.0 cm×7.5 cm, 200 mAh/g equivalent) to a stainless mesh having a thickness of 80 µm and an exterior film deep drawn to 8.5 mm were used, similarly to example 2, four film type cells 4 were assembled. The metal lithium disposed in the cell corresponds to 400 mAh/g per unit weight of negative electrode active material and a weight of the positive electrode active material was 0.7 times that of the negative electrode active material, that is, it is a constitution where weight of the positive electrode active material is less contained.

When one cell was left for 20 days after assembling the cell and disassembled, the metal lithium was found completely disappeared in all. Accordingly, it was judged that lithium ion for obtaining the capacitance of 2222 F/g or more per unit weight of the negative electrode active material was doped. The capacitance of the negative electrode amounts to 23 times the electrostatic capacitance of the positive electrode.

Furthermore, another cell was charged under a constant current of 2000 mA to a cell voltage of 4.0 V, followed by carrying out a constant current-constant voltage charging where a constant voltage of 4.0 V was applied for 1 hr. In the next place, the discharge was carried out over 1 hr under a constant current to a cell voltage of 2.0 V. Within 1 hr after the discharge came to completion, the cell was disassembled, and the negative electrode potential was measured and found to be 0.07 V.

Remaining two cells were charged under a constant current of 2000 mA to a cell voltage of 4.0 V, followed by applying a constant current-constant voltage charging where a constant voltage of 4.0 V was applied for 1 hr. In the next place, under a constant current of 200 mA, the discharge was carried out to a cell voltage of 2.0 V. The discharge cycle of 4.0 V-2.0 V was repeatedly applied and, in the tenth discharge, the cell capacity and the energy density were evaluated. Furthermore, as the endurance test, in a thermostat set at 60° C., a voltage of 4.0 V was continuously applied for 1000 hr, followed by leaving to cool to room temperature, further followed by measuring the capacity. The cell after the endurance test was free from inconveniences such as the gas generation and did not show deformation. Results are shown in Table 5. Data are average values of two cells.

TABLE 5

| | Initial capacity (mAh) | Energy density (Wh/l) | Capacity after endurance test (mAh) | Capacity retention rate (%) |
|---|---|---|---|---|
| Example 3 | 244 | 13.1 | 232 | 95.0 |

When the lithium ion of 400 mAh/g was doped to the negative electrode active material, similarly to example 1, the negative electrode potential when the discharge is applied to a voltage one half the charging voltage of the cell becomes 0.15 V or less to the metal lithium potential. Accordingly, a lithium ion capacitor high in the capacity and energy density and excellent in the endurance could be obtained. However, since the energy density is higher in example 1 where the weight of the positive electrode active material is heavier than that of the negative electrode active material, the weight of the positive electrode active material is preferred to be larger than that of the negative electrode active material.

Comparative Example 2

Producing Method of Negative Electrode 3

A phenol resin molded plate having a thickness of 0.5 mm was put in a siliconit electric furnace and heated under a nitrogen atmosphere to 500° C. at a temperature-up speed of 50° C./hr, followed by further heating to 860° C. at a temperature-up speed of 10° C./hr, further followed by heat-treating, and thereby a PAS plate was synthesized. Thus obtained PAS plate was pulverized by use of a disk mill and thereby a PAS powder was obtained. The PAS powder had the H/C ratio of 0.08.

In the next place, 100 parts by weight of the PAS powder and a solution obtained by dissolving 10 parts by weight of polyvinylidene fluoride powder in 80 parts by weight of N-methyl pyrrolidone were thoroughly blended, and thereby a negative electrode slurry 2 was obtained. The negative electrode slurry 2 was coated on one surface of a copper foil having a thickness of 18 µm so as to be substantially 7 mg/cm² as a solid content, followed by drying and pressing, and thereby a negative electrode 3 was obtained.
(Measurement of Capacitance Per Unit Weight of Negative Electrode 3)

From the negative electrode 3, four sheets having a size of 1.5 cm×2.0 cm were cut and used as evaluation electrode. The negative electrode and metal lithium having a size of 1.5 cm×2.0 cm and a thickness of 200 µm as a counter electrode were assembled through a polyethylene non-woven fabric having a thickness of 50 µm as a separator to prepare a simulated cell. As a reference electrode, metal lithium was used. As an electrolytic solution, a solution obtained by dissolving $LiPF_6$ in propylene carbonate at a concentration of 1 mol/l was used.

To unit weight of a negative electrode active material, at a charge current of 1 mA, lithium ion was charged by 500 mAh/g, followed by discharging to 1.5 V at 1 mA. From a discharging time during which the negative electrode potential varies by 0.2 V from the negative electrode potential 1 minute after the discharge start, the electrostatic capacitance per unit weight of the negative electrode 3 was obtained and found to be 1150 F/g.

(Producing Method of Negative Electrode 4)

On both surfaces of a copper expanded metal (produced by Nippon Metal Industry Co., Ltd.) that has a thickness of 26 μm (porosity: 54%) and where LW:SW:W=1.3:0.65:0.136, the negative electrode slurry 2 was vertically coated at a speed of 1 m/min by use of a die coater, followed by forming, further followed by pressing, and thereby a negative electrode 4 having a thickness of an entire negative electrode (sum total of thicknesses of electrode layers on both surfaces of the negative electrode and a layer thickness of a negative electrode current collector) of 135 μm was obtained.

(Preparation of Cell 5)

Except that, as a lithium electrode, one obtained by pressure bonding a metal lithium foil (thickness: 93 μm, 6.0 cm×7.5 cm, equivalent to 250 mAh/g) to a stainless mesh having a thickness of 80 as a negative electrode, the negative electrode 4 and an exterior film deep drawn to 6.5 mm were used, similarly to example 1, four film type cells 5 were assembled. The metal lithium disposed in the cell corresponds to 500 mAh/g per unit weight of negative electrode active material and a weight of the positive electrode active material was 1.4 times that of the negative electrode active material.

When one cell was left for 20 days after assembling the cell and disassembled, the metal lithium was found completely disappeared in all. Accordingly, it was judged that lithium ion for obtaining capacitance of 1150 F/g per unit weight of the negative electrode active material was doped by charging in advance. The capacitance of the negative electrode amounts to 12 times the capacitance of the positive electrode.

Furthermore, another cell was charged under a constant current of 2000 mA to a cell voltage of 4.0 V, followed by carrying out a constant current-constant voltage charge where a constant voltage of 4.0 V was applied for 1 hr. In the next place, the discharge was carried out over 1 hr under a constant current to a cell voltage of 2.0 V. Within 1 hr after the discharge came to completion, the cell was disassembled, and the negative electrode potential was measured and found to be 0.27 V.

Remaining two cells were charged under a constant current of 2000 mA to a cell voltage of 4.0 V, followed by applying a constant current-constant voltage charge where a constant voltage of 4.0 V is applied for 1 hr. In the next place, under a constant current of 200 mA, the discharge was carried out to a cell voltage of 2.0 V. The discharge cycle of 4.0 V-2.0 V was repeatedly applied and, in the tenth discharge, the cell capacity and the energy density were evaluated. Furthermore, when, as the endurance test, in a thermostat set at 60° C., a voltage of 4.0 V was applied, since a gas was generated in the cell and the cell was expanded, the test was stopped. Results are shown in Table 6. Data are average values of two cells.

TABLE 6

| | Initial capacity (mAh) | Energy density (Wh/l) | Capacity after endurance test (mAh) | Capacity retention rate (%) |
|---|---|---|---|---|
| Comparative Example 2 | 224 | 16.5 | Incapable measurement | Incapable measurement |

Even when the PAS having the H/C ratio of 0.08 was used in a negative electrode active material, in the case of the lithium ion being doped by 500 mAh/g in advance to the negative electrode, high capacity and high energy density were obtained. However, since the cell was remarkably expanded in the endurance test where 4.0 V was continuously applied at 60° C., in order to obtain a lithium ion capacitor having the endurance at 4.0 V, the non-graphitizable carbon having the H/C ratio of less than 0.05 is necessarily used as a negative electrode active material.

Comparative Example 3

Producing Method of Negative Electrode 5

On both surfaces of a copper expanded metal (produced by Nippon Metal Industry Co., Ltd.) that has a thickness of 26 μm (porosity: 54%) and where LW:SW:W=1.3:0.65:0.136, the negative electrode slurry 2 described in comparative example 2 was vertically coated at a speed of 1 m/min by use of a die coater, followed by forming, further followed by pressing, and thereby a negative electrode 5 having a thickness of an entire negative electrode (sum total of thicknesses of electrode layers on both surfaces of the negative electrode and a layer thickness of a negative electrode current collector) of 377 μm was obtained.

(Preparation of Cell 6)

Except that, as a lithium electrode, one obtained by pressure bonding a metal lithium foil (thickness: 281 μm, 6.0 cm×7.5 cm, equivalent to 250 mAh/g) to a stainless mesh having a thickness of 80 μm, as a negative electrode, the negative electrode 5 and an exterior film deep drawn to 9.0 mm were used, similarly to example 1, four film type cells 6 were assembled. The metal lithium disposed in the cell corresponds to 500 mAh/g per unit weight of negative electrode active material and a weight of the positive electrode active material was 0.45 times that of the negative electrode active material, that is, weight of the negative electrode active material being larger than that of the positive electrode active material.

When one cell was left for 20 days after assembling the cell and disassembled, the metal lithium was found completely disappeared in all. Accordingly, it was judged that lithium ion for obtaining capacitance of 1150 F/g per unit weight of the negative electrode active material was doped by charging in advance. The capacitance of the negative electrode amounts to 12 times the capacitance of the positive electrode.

Figure 1:
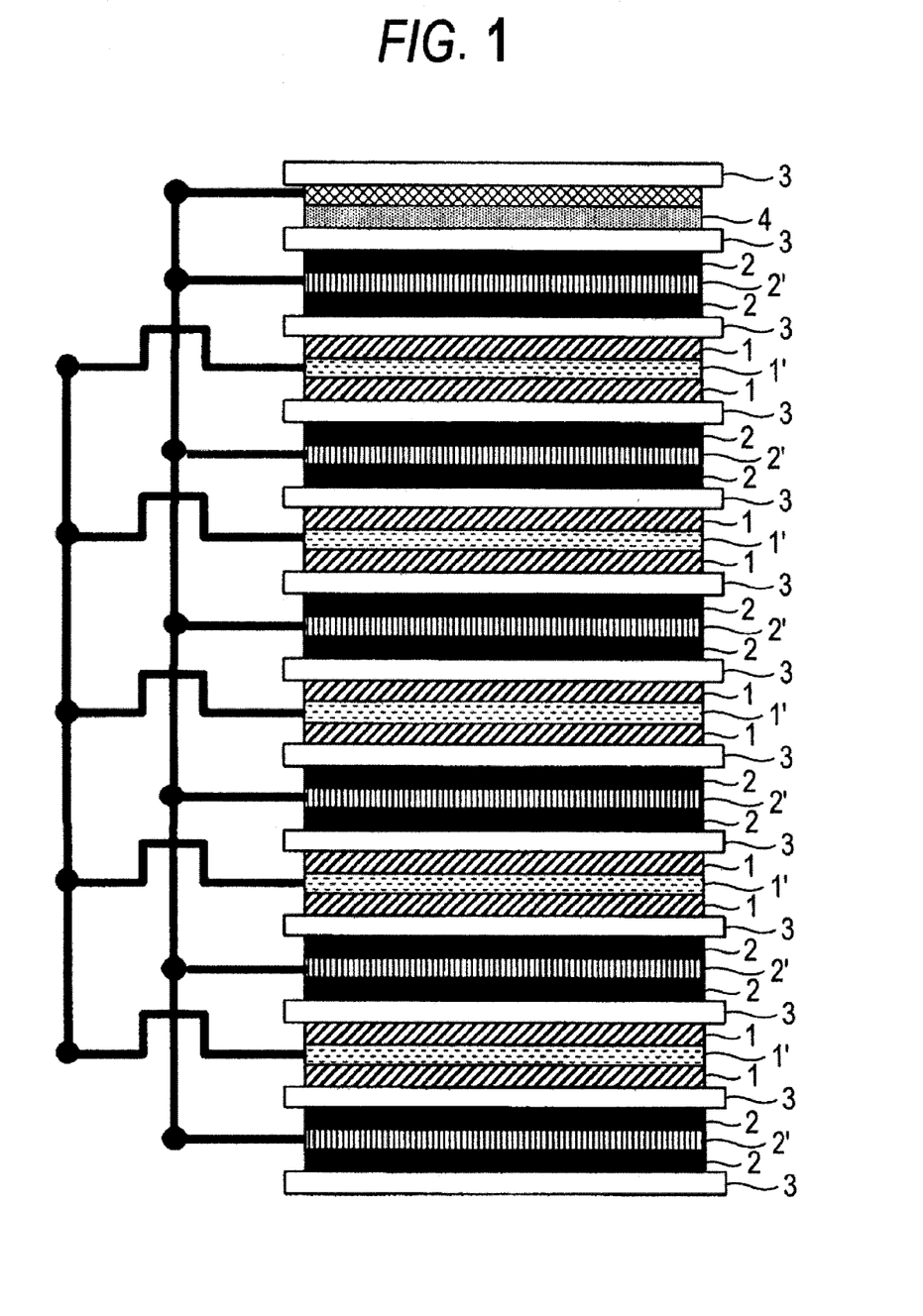
FIG. 1 shows an exemplary embodiment of the layer structure of a three-electrode laminated unit.

FIG. 1 shows an exemplary embodiment of the layer structure of a three-electrode laminated unit. Reference numerals denote the following:

1: Positive Electrode
1': Current Collector of Positive Electrode
2: Negative Electrode
2': Current Collector of Negative Electrode
3: Separator
4: Lithium Electrode In view of the detailed description found above, one of ordinary skill in the art will appreciate that an exemplary embodiment of a lithium ion capacitor cell may include a three-electrode laminated unit impregnated with an electrolytic solution. In an exemplary embodiment, the electrolytic solution may be made from a non-protonic organic solvent electrolytic solution of a lithium salt and impregnated under vacuum.

Furthermore, another cell was charged under a constant current of 2000 mA to a cell voltage of 4.0 V, followed by carrying out a constant current-constant voltage charge where a constant voltage of 4.0 V was applied for 1 hr. In the next place, the discharging was carried out over 1 hr under a constant current to a cell voltage of 2.0 V. Within 1 hr after the discharge came to completion, the cell was disassembled, and the negative electrode potential was measured and found to be 0.14 V.

Remaining two cells were charged under a constant current of 2000 mA to a cell voltage of 4.0 V, followed by applying a constant current-constant voltage charge where a constant voltage of 4.0 V is applied for 1 hr. In the next place, under a constant current of 200 mA, the discharging was carried out to a cell voltage of 2.0 V. The discharge cycle of 4.0 V-2.0 V was repeatedly applied and, in the tenth discharging, the cell capacitance and the energy density were evaluated. Furthermore, as the endurance test, when, in a thermostat set at 60° C., a voltage of 4.0 V was applied, since a gas was generated in the cell and the cell was expanded, the test was stopped. Results are shown in Table 7. Data are average values of two cells.

TABLE 7

|  | Initial capacity (mAh) | Energy density (Wh/l) | Capacity after endurance test (mAh) | Capacity retention rate (%) |
| --- | --- | --- | --- | --- |
| Comparative Example 3 | 240 | 11.8 | Incapable measurement | Incapable measurement |

In order to make the negative electrode potential when the cell is discharged to a voltage one half the charging voltage of the cell 0.15 V or less relative to the metal lithium potential, as mentioned above, the negative electrode active material is necessary in large excess than the positive electrode active material; accordingly, the energy density becomes smaller than that of comparative example 2. Furthermore, even when the negative electrode potential when the cell is discharged to a voltage one half the charging voltage of the cell was 0.15 V or less relative to the metal lithium potential, the cell was remarkably expanded in the endurance test where 4.0 V was continuously applied at 60° C. Accordingly, in order to obtain a lithium ion capacitor having the endurance at 4.0 V, the non-graphitizable carbon having the H/C ratio of less than 0.05 is necessarily used.

Although, the invention was described in detail and with reference to particular embodiments, it is obvious for ones skilled in the art that, without deviating from the spirit and scope of the invention, various modifications and corrections can be applied.

The application claims a priority from Japanese Patent Application No. 2005-302342, filed on Oct. 17, 2005; the entire contents of which are incorporated herein by reference.

INDUSTRIAL APPLICABILITY

The lithium ion capacitor of the invention is very effective as a driving or auxiliary storage power supply for an electric car or a hybrid electric car. Furthermore, it can be preferably used as well as a driving storage power supply for an electric car or an electric wheelchair, an electric storage device of various kinds of energies such as solar energy or wind-power generation, or a storage power supply for domestic electric appliances.

The invention claimed is:

1. A lithium ion capacitor comprising:
   a positive electrode made of a material capable of reversibly carrying either one or both of a lithium ion and an anion;
   a negative electrode made of a material capable of reversibly carrying a lithium ion; and
   an electrolytic solution made of a non-protonic organic solvent electrolytic solution of a lithium salt;
   wherein a negative electrode active material is non-graphitizable carbon having a ratio of number of hydrogen atoms to number of carbon atoms of 0.003 or more and less than 0.02; and
   wherein the lithium ion is doped in advance to either one or both of the negative electrode and the positive electrode so that a negative electrode potential when a cell is discharged to a voltage one half a charging voltage of the cell is 0.15 V or less relative to a lithium ion potential.

2. The lithium ion capacitor according to claim 1, wherein the lithium ion is doped to either one or both of the negative electrode and positive electrode in a range of 400 to 600 mAh/g per weight of the negative electrode active material.

3. The lithium ion capacitor according to claim 2, wherein either one or both of the positive electrode and negative electrode, respectively, are provided with a current collector having a hole penetrating through between front and back surfaces; and either one or both of the negative electrode and positive electrode come into contact electrochemically with a lithium ion supply source to dope the lithium ion to either one or both of the negative electrode and positive electrode.

4. The lithium ion capacitor according to claim 2, wherein the negative electrode active material has capacitance per unit weight of three times or more than that of the positive electrode active material; and a weight of the positive electrode active material is larger than a weight of the negative electrode active material.

5. The lithium ion capacitor according to claim 2, wherein the positive electrode active material is a polyacene organic semiconductor that is a pyrolysis product of activated carbon or an aromatic condensate polymer and has a polyacene skeleton structure where a ratio of number of hydrogen atoms to number of carbon atoms is in the range of 0.05 to 0.50.

6. The lithium ion capacitor according to claim 1, wherein either one or both of the positive electrode and negative electrode, respectively, are provided with a current collector having a hole penetrating through between front and back surfaces; and either one or both of the negative electrode and positive electrode come into contact electrochemically with a lithium ion supply source to dope the lithium ion to either one or both of the negative electrode and positive electrode.

7. The lithium ion capacitor according to claim 6, wherein the negative electrode active material has capacitance per unit weight of three times or more than that of the positive electrode active material; and a weight of the positive electrode active material is larger than a weight of the negative electrode active material.

8. The lithium ion capacitor according to claim 6, wherein the positive electrode active material is a polyacene organic semiconductor that is a pyrolysis product of activated carbon or an aromatic condensate polymer and has a polyacene skeleton structure where a ratio of number of hydrogen atoms to number of carbon atoms is in the range of 0.05 to 0.50.

9. The lithium ion capacitor according to claim 1, wherein the negative electrode active material has capacitance per unit weight of three times or more than that of the positive electrode active material; and a weight of the positive electrode active material is larger than a weight of the negative electrode active material.

10. The lithium ion capacitor according to claim 9, wherein the positive electrode active material is a polyacene organic semiconductor that is a pyrolysis product of activated carbon or an aromatic condensate polymer and has a polyacene skeleton structure where a ratio of number of hydrogen atoms to number of carbon atoms is in the range of 0.05 to 0.50.

11. The lithium ion capacitor according to claim 1, wherein the positive electrode active material is a polyacene organic semiconductor that is a pyrolysis product of activated carbon or an aromatic condensate polymer and has a polyacene skeleton structure where a ratio of number of hydrogen atoms to number of carbon atoms is in the range of 0.05 to 0.50.

12. The lithium ion capacitor according to claim 1, the non-graphitizable carbon being obtained without a chlorination treatment.

13. The lithium ion capacitor according to claim 12, wherein the non-graphitizable carbon is obtained from furfuryl alcohol.

* * * * *